Patented Oct. 30, 1934

1,978,537

UNITED STATES PATENT OFFICE 1,978,537

PROCESS OF REFINING METALS

William R. Jeavons, Cleveland Heights, and
Mahlon J. Rentschler, Willoughby, Ohio No Drawing. Application May 16, 1931,
Serial No. 537,986

2 Claims. (Cl. 75—17)

This invention relates to the refining or purifying of metals and more particularly to a process for refining metals by removing one or more metals from a mixture of metals.

Our invention is particularly applicable to the treatment of a mixture of metals having comparatively low melting points, such as certain of the non-ferrous metals and has for its object to enable this separation in an effective and economical manner.

For a better understanding of our invention, we would call attention to the well-known fact that the term "chemical strength" when applied to metals refers to their relative chemical activity; or, more precisely, to their relative positions in a series which arranges the metals with respect to their chemical activity, regarded as having an electrochemical basis. This series is known in metallurgy as the electropotential series or electromotive-force series of metals. Ease or difficulty of oxidation and reduction, as well as other phases of chemical activity, are found to be governed in this manner; those metals higher in the series exhibiting the greater activity or "strength" and those lower in the series having relative chemical "weakness". In such a series, it will be found that the alkali metals, such as potassium and sodium, and the alkaline earth metals, such as barium and calcium, occupy the head of the series; while the noble metals, such as platinum and gold, occupy the foot of the series.

We have found that when metals are subjected to the action of oxygen, and particularly when subjected to the action of active or nascent oxygen, the relative ease or difficulty with which they combine with the oxygen depends upon their relative positions in the series. Oxygen can be applied to metals in a number of different ways, but we prefer to use barium peroxide for this purpose. We have found that commercial barium peroxide when heated alone begins to decompose into oxygen and barium monoxide at a temperature of approximately 1200° F., the rate of decomposition depending upon the purity of the barium peroxide. Metals which melt above this temperature are readily treated with oxygen by agitating them with barium peroxide, the liberated oxygen in this case being in a nascent condition and oxidizing the different metals in the batch at a rate depending upon their relative positions in the series. When the barium peroxide has given up its oxygen, the residual barium oxide, if fused, reacts with the oxides of the metals formed, producing easily fusible slags which can be readily separated from the purified metal or metals remaining.

When, however, the melting point of the metals to be treated lies below the decomposition point of barium peroxide, it becomes necessary to bring about the decomposition of this substance in some other way. We have found that barium peroxide in the presence of water or water vapor will decompose at a very much lower temperature than approximately 1200° F., in some cases such decomposition beginning at a temperature as low as 135° F. Thus, if moistened barium peroxide is introduced into melted metal, both steam and oxygen are evolved, whereby the melt is agitated and the metals oxidized in accordance with their positions in the series above referred to. For practical work, we prefer to compress the moistened barium peroxide into lumps or blocks and immerse them in the metal bath, preferably by fastening them to steel rods which can be used as stirrers. When the moistened barium peroxide is exposed to the mixture of molten metals, the evolution of steam and oxygen begins at the outside of each block or lump and proceeds inwardly, due to the low heat conductivity of the material. The oxygen, being in a nascent condition, proceeds to exercise its oxidizing effect in the manner pointed out hereinbefore. Part of the steam which is liberated at the comparatively low temperature of the melt combines with a part of the barium oxide resulting from the decomposition of the barium peroxide to produce a corresponding proportion of anhydrous barium hydroxide $(Ba(OH)_2)$, which is mingled with the barium oxide. The action described may continue until each block or lump of barium peroxide is completely decomposed into barium oxide and anhydrous barium hydroxide, depending upon the length of time the lumps or blocks are subjected to the action of the melt. This barium hydroxide lowers the melting point of the barium oxide with which it is intermingled, thereby enabling the oxides to be fluxed at a correspondingly low temperature. When the oxidation has proceeded as far as desired, or, while it is in progress, we may introduce anhydrous barium hydroxide directly into the melt which, because of the low temperature at which it melts, will still further contribute to the fluxing of the oxides; but, if the temperature of the melt is sufficiently high, the oxides are fluxed by the barium monoxide which is formed when the barium peroxide is decomposed in the manner described hereinbefore.

To illustrate our process: We may melt a mixture of metals containing 99% copper and 1% tin and oxidize the mixture with barium peroxide, thereby producing the oxides of tin and copper. The tin, occupying a position higher in the electrochemical series than the copper, is oxidized more rapidly than the former. The result is that all of the tin will be oxidized, but only a very small proportion of the copper will be oxidized. Both the tin and copper oxides which are formed react readily with the residual barium monoxide and anhydrous barium hydroxide, producing easily fusible compounds which are readily fluxed off, leaving the copper in a substantially pure form and with a very small loss of the copper content of the melt.

It will be obvious that our process is particularly applicable to cases where small quantities of easily oxidizable metals are to be removed from a molten mass of metals containing a metal which is oxidizable with greater difficulty.

Having thus described our invention, what we claim is:

1. The process of removing a metal from a mixture thereof with one or more metals lower in the electromotive force series which comprises treating the molten mixture or alloy with moistened barium peroxide.

2. The process of separating a metal from a molten mixture of metals which comprises introducing beneath the surface of such mixture one or more aggregates of moist barium peroxide whereby to agitate the mixture, liberate oxygen at a temperature below the decomposition temperature of dry barium peroxide and provide a low melting flux for the resulting metal oxides.

WILLIAM R. JEAVONS.
MAHLON J. RENTSCHLER.